Patented June 21, 1932

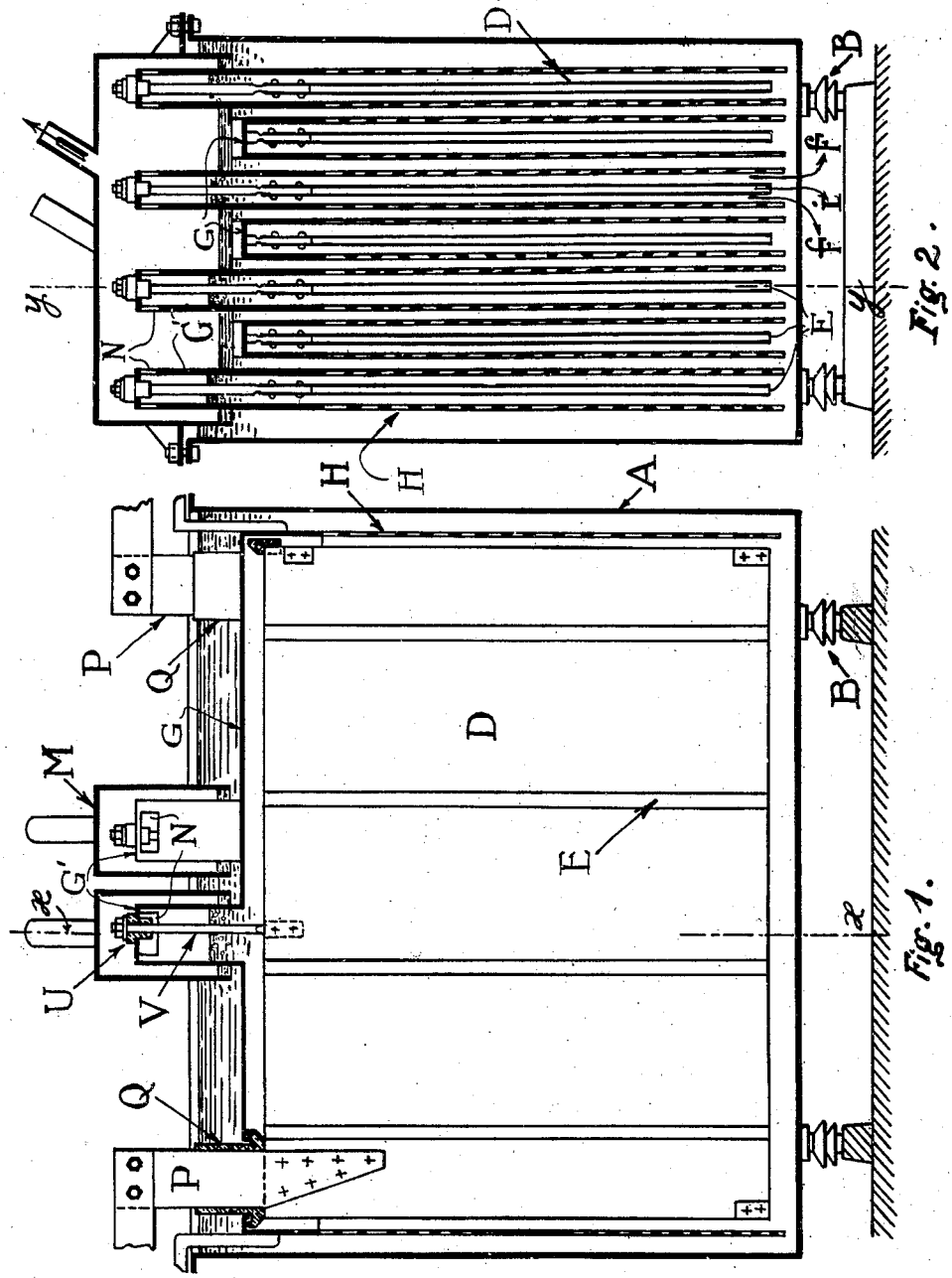

1,864,344

UNITED STATES PATENT OFFICE

GIACOMO FAUSER, OF NOVARA, ITALY, ASSIGNOR TO MONTECATINI, SOCIETA GENERALE PER L'INDUSTRIA MINERARIA ED AGRICOLA OF MILAN, ITALY, A JOINT-STOCK COMPANY OF ITALY

ELECTROLYZER FOR THE PRODUCTION OF HYDROGEN AND OXYGEN

Application filed May 8, 1928, Serial No. 276,180, and in Italy June 14, 1927.

The object of the present invention is to simplify and improve the construction of the electrolyzers for the production of hydrogen and oxygen, and in particular to avoid gas leakage through the insulating joints.

The apparatus is illustrated by way of example in longitudinal and cross-section in Figs. 1 and 2 of the accompanying drawing, it being understood, however, that the invention is not limited to the details shown on the drawing.

The electrolyzer comprises a parallelepipedous tank A made of iron or other suitable material, carried on insulators B and containing the water to be decomposed, which is made electrically conductive by the addition of an alkaline solution.

In this bath are immersed the alternately positive and negative electrodes B, surrounded by a shroud H of woven asbestos. Said shroud H is open at the bottom thereof but extends below the electrodes D and serves to prevent the diffusion of the gases developing on the electrodes. Four positive (anodes) and three negative (cathodes) electrodes are shown on the drawing, but their number is not limited.

Each electrode comprises two plane and parallel plates D spaced apart from each other by ribs E in such a manner as to leave a space I between the two plates. Owing to the gas bubbles disengaging themselves on the outer surface of the electrodes when current is passing, the liquid contained in the space F between the electrode and the shroud has a lower specific weight than the liquid contained in the space I left between the two plates, this latter liquid not being subjected to electrolytic action. A liquid current thus establishes itself, this current having an upward direction in the space F and a downward direction in the space I, the circulation being more energetic as the current intensity increases. The object of this circulation is to carry the gas bubbles to the surface with greater velocity, as otherwise they would take a long time to rise to the surface and the gas concentration—and therewith also the ohmic resistance—would accordingly be increased. The gas bubbles disengaging themselves at the top are collected in gas chambers G' of the bells G. Said chambers G' are above the liquid level and are provided with outlet openings N through which collected gas escapes.

Each electrode is hung from the top of the gas collecting chamber G' by means of a non-conductive tie rod V fixed to the top of said chamber through the medium of an insulating washer U.

The positive and negative electrodes are so arranged that all the outlet openings for the gases are connected with one another by two collectors M which are liquid sealed, the gases being led from the said collectors to the respective gasometers by suitable pipings.

In order to reduce the spacing apart of the electrodes from each other to a minimum, the current is supplied to the anodes and cathodes by means of flat copper blades P, these blades being directly riveted between two plates D in order to insure a good distribution of the electric current.

Said copper blades P are led through the collecting boxes in insulated, tight joints Q; owing to the high conductivity of copper, they may be very thin, even when they are intended to carry currents of considerable intensity, the construction of the insulating joint being thus facilitated.

In order to prevent the copper from being attacked by the alkaline solution, said blades are protected by nickel plating.

The conductors or blades P are riveted alternatively at the opposite upper corners of the electrodes in order to reduce to a minimum the length of the two cross bars connecting the blades P respectively to the conductor of positive current and to the conductor of negative current (not shown).

Having now particularly described and ascertained the nature of my said invention and in what manner the same is to be performed, I declare that what I claim is:—

Electrolytic apparatus for the electrolysis of water, including a parallelepipedous tank containing the electrolyte, a plurality of flat elongated bells, immersed in parallelism in said electrolyte and each provided at its upper part with a gas collecting chamber extending above the liquid level, a bilamellar rectangular electrode suspended at the top of each of said collecting chambers by means of a single non-conductive tie-rod and a copper blade with nickel plating for supplying the electric current to each of said electrodes being riveted between the two lamellæ constituting each of said electrodes at one of the upper corners of said latter, the electrodes being alternately an anode and a cathode, the chambers for collecting the hydrogen being aligned across the tank in parallelism to the chambers for collecting the oxygen and the blades for supplying the positive current being aligned across one end of the tank while the blades for supplying the negative current are aligned across the opposite end of the tank.

Signed at Milan, Italy, this 17th day of April, 1928.

GIACOMO FAUSER.